UNITED STATES PATENT OFFICE.

GEORGES IMBERT, OF NUREMBERG, GERMANY.

PROCESS OF OBTAINING CHLOR-ACETIC ACID.

935,606. Specification of Letters Patent. Patented Sept. 28, 1909.

No Drawing. Original application filed May 1, 1907, Serial No. 371,237. Divided and this application filed March 2, 1908. Serial No. 418,898.

*To all whom it may concern:*

Be it known that I, GEORGES IMBERT, a citizen of the German Empire, and resident of Nuremberg, Bavaria, Germany, have invented a new and useful Process for Obtaining Chlor-Acetic Acid, of which the following is a full, clear, and exact description.

It is known that if di-chlor-ethoxy-ethylene is continually heated with a surplus of water it will be converted into glycolic acid. I have found that, if the saponification is not completed, but the reaction interrupted the moment the initially double-phase system has become homogeneous, a solution of chlor-acetic-acid will be obtained, from which the latter may be gained by rapid vaporization.

The process may be expressed by the following equation:—

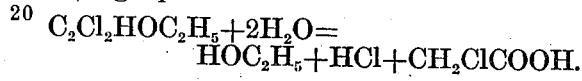

$$C_2Cl_2HOC_2H_5 + 2H_2O = HOC_2H_5 + HCl + CH_2ClCOOH.$$

For example, if 100 kg. of di-chlor-ethoxy-ethylene are heated with 400 kg. of water by the aid of a return-flow cooling apparatus, until the mixture has just turned homogeneous, and the resulting solution is evaporated *in vacuo*, the chlor-acetic-acid will remain in crystallized form.

I claim as my invention:—

1. A process of producing chlor-acetic-acid which consists in heating di-chlor-ethoxy-ethylene with a surplus of water until the result is a homogeneous solution and subsequently rapidly evaporating.

2. A process of producing chlor-acetic-acid which consists in heating di-chlor-ethoxy-ethylene with a surplus of water, until the result is a homogeneous solution and subsequently evaporating in a vacuum.

In testimony whereof I affix my signature in the presence of two witnesses.

GEORGES IMBERT.

Witnesses:
 ERICH BAUM,
 EUGEN SAL. SENTZE.